United States Patent [19]

Yoshida

[11] Patent Number: 5,110,516

[45] Date of Patent: May 5, 1992

[54] PROCESS OF MAKING A LEAD WIRE OF HARD CARBON

[75] Inventor: Mitsuru Yoshida, Fujioka, Japan

[73] Assignee: Mitsubishi Pencil Co., Ltd., Tokyo, Japan

[21] Appl. No.: 563,955

[22] Filed: Aug. 6, 1990

Related U.S. Application Data

[63] Continuation of Ser. No. 347,258, May 4, 1989, abandoned.

[51] Int. Cl.⁵ .............. B29C 47/00; C01B 31/02
[52] U.S. Cl. ................... 264/29.6; 264/102; 264/210.6; 264/211.2; 423/448; 423/449
[58] Field of Search ............ 264/29.1, 29.5, 29.6, 264/102, 210.6, 211.2; 423/445, 448, 449

[56] References Cited

U.S. PATENT DOCUMENTS

| | | | |
|---|---|---|---|
| 3,852,429 | 12/1974 | Murayama et al. | 423/449 |
| 3,960,768 | 6/1976 | Ripperger et al. | 264/29.1 X |
| 4,293,533 | 10/1981 | Asano et al. | 423/449 |
| 4,582,632 | 4/1986 | Rokujo et al. | 264/29.6 X |

FOREIGN PATENT DOCUMENTS

| | | | |
|---|---|---|---|
| 2213009 | 9/1973 | Fed. Rep. of Germany | 264/29.1 |
| 59-164674 | 9/1984 | Japan | 423/448 |
| 61-86410 | 5/1986 | Japan | |

OTHER PUBLICATIONS

English-Language Translation of Japanese Reference (KOKAI) 59-164,674.

*Primary Examiner*—Leo B. Tentoni
*Attorney, Agent, or Firm*—Oliff & Berridge

[57] ABSTRACT

A process for producing a lead wire of hard carbon for supplying power to a fuel battery, including the steps of mixing carbon powder and monomer or precondensate of furan resin with binder containing as a main ingredient chlorine-containing vinyl resin which is carbonized after calcining, uniformly mixing and dispersing the mixture composition, applying high shearing force to the mixture composition, extrusion molding the composition in a rod shape, insolubilizing and infusibilizing the molding, and calcining the molding in an inert gas atmosphere, thereby obtaining the lead wire of hard carbon for supplying power to the fuel battery. Thus, the process can industrially simply and inexpensively produce lead wires of hard carbon for supplying power with small electric resistance to the fuel battery which does not consume electricity generated as Joule heat, and has excellent corrosion resistance against electrolytes of high temperature and high acid concentration.

5 Claims, No Drawings

PROCESS OF MAKING A LEAD WIRE OF HARD CARBON

This is a continuation of application Ser. No. 07/347,258 filed May 4, 1989, now abandoned.

BACKGROUND OF THE INVENTION

The present invention relates to a process for producing lead wires of hard carbon for supplying power to a fuel battery. More particularly, the invention relates to an inexpensive and simple industrial process for producing lead wires of hard carbon having excellent corrosion resistance against electrolyte in a fuel battery, light weight, high hardness and high mechanical strength.

Lead wires for supplying power to a fuel battery are generally desired to satisfy the following conditions:
(1) Electricity generated with little electric resistance and which is not consumed as Joule heat.
(2) Excellent corrosion resistance against electrolyte of high temperature and high acid, alkaline or solubilized salt solution concentrations, and without deterioration in quality over an extended period.
(3) Light weight so that the weight of the entire fuel battery device is not excessively large.
(4) High surface hardness and excellent wear resistance.
(5) High mechanical strength, such as bending strength and Young's modulus.
(6) Industrially simple and inexpensive to produce.

Heretofore, lead wires used for general power purposes have been made of metal wires such as copper wires. However, the metal wires are not appropriate as lead wires of a fuel battery in regard to durability against high temperature electrolyte. Novel metals, such as gold and platinum are better than copper against corrosion resistance, but still are not satisfactory, and are excessively expensive and accordingly are not suitable for use. Metals generally have a large specific weight which is considered to be disadvantageous because the weight of the fuel battery device is excessively increased.

On the other hand, carbon materials have been used as electrodes in the electrolytic and dry battery industries, etc., due to excellent features such as excellent electric conductivity, corrosion resistance, and light weight. A process for producing the electrodes includes the steps of using coke powder and graphite powder as fillers, and pitches as binder such as petroleum pitch and coal pitch, mixing and kneading both, extrusion molding the mixture, injection molding the mixture, calcining to carbonize the mixture, and graphiting the carbonized mixture as required. However, when considering the thickness of the unit cell of a fuel battery and the specific resistance of the carbon material, lead wires for supplying power in the fuel battery preferably employ carbon rods having a diameter of several mm or shorter, and more preferably 2 to 4 mm. However, since the mechanical strength of the carbonaceous material according to the above process is extremely small, such as 50 MPa at the maximum, the carbon rods having a thickness of 2 to 4 mm lack absolute strength, and are not proper for use.

Recently, as the carbon material industry was developed, self-sintered carbon material was obtained by using mesocarbon microbeads, semicoke powder or coking coal powder, molding the material by an isostatic pressing method, etc., carbonizing the material and then graphiting the carbonized material. This process has been used for artifical graphite electrodes having high strength. However, since these materials are obtained in a block state due to the restriction in the producing process, it is necessary to cut the material by machining for use as lead wires. However, the mechanical strength of the obtained product is lower than the base material because of damage or cracks produced on the carbon material from the mechanical workings. In addition, even if a high strength product is obtained having a maximum mechanical strength of 1000 MPa of bending strength, such strength is not sufficient. The materials are economically expensive considering the long steps of cutting and damage during working due to insufficient mechanical strength.

The artifical graphite materials have further drawbacks in relation to the electrolyte. When artificial graphite materials are contacted with a high concentration of acid or solubilized salt, the material between graphite layers is easily deteriorated in its quality. Further, surface hardness is small and the materials are easily worn. Accordingly, such materials are not satisfactory as lead wires for a fuel battery.

The inventor has previously invented a process for producing vitreous carbon fine wires made by mixing and dispersing a mixture composition containing chlorinated vinyl chloride resin as the main ingredient, extrusion molding the kneaded material in a fine wire state, carbon pretreating the resultant molding, and then calcining the carbon pretreated molding in an inert gas atmosphere. This process was filed as a patent application under Japanese Patent Laid-open No. 86410/1986. Since the carbon obtained by this process is vitreous, it has the advantages of excellent corrosion resistance against electrolyte, high surface hardness, high mechanical strength, and light weight. However, the carbon has a drawback in that its specific resistance is relatively large, i.e., on the order of $10^{-3}$ ohm-cm. In order to avoid this drawback, the diameter of the lead wire made of carbon must be large. Further, according to this process, since the main ingredient of the mixture composition is solely the chlorinated vinyl chloride resin, it has such a drawback that the carbon pretreating step of molding is slow, and it is extremely difficult to form a diameter of 1 mm or more of the obtained product after carbonization, and it is not preferable as an effective lead wire.

SUMMARY OF THE INVENTION

Accordingly, an object of the present invention is to provide a process for industrially simply and inexpensively producing lead wires of hard carbon for supplying power to a fuel battery, which cannot be obtained or is extremely difficult to obtain by conventional processes. It is a further object to obtain lead wires of hard carbon having little electric resistance so that electricity is not consumed through generation as Joule heat, and having excellent corrosion resistance against electrolyte of high temperature and high concentrations of acid, alkaline or solubilized salt solutions, no deterioration over an extended period, light weight, high surface hardness, excellent wear resistance, and large mechanical strengths, such as a large bending strength and Young's modulus, etc.

The inventor has devised from results of studies in view of the above-described drawbacks to achieve the above-mentioned objects, and as a result invented a process for producing lead wires of hard carbon for supplying power to a fuel battery comprising the steps of mixing carbon powder with binder containing as main ingredients monomer or precondensate of furan resin and chlorine-containing vinyl resin which is carbonized after calcining, uniformly mixing and dispersing the mixture composition, applying high shearing force to the mixture composition for sufficient kneading, extrusion molding the composition in a rod shape, insolubilizing and infusibilizing the molding, and calcining the molding in an inert gas atmosphere, thereby obtaining the lead wires of hard carbon for supplying power to the fuel battery to satisfy all the above-mentioned conditions.

DESCRIPTION OF PREFERRED EMBODIMENTS

In the present invention, the furan resin employs one or more types of synthetic resins having a furan ring in the molecular structure, such as furfuryl alcohol resin, furfuryl alcohol/furfural cocondensate resin, furfural/phenol cocondensate resin, furfural/ketone cocondensate resin, furfuryl alcohol/phenol cocondensate resin, etc., and preferably employs monomer or precondensate of these resins.

Preferably usable chlorine-containing vinyl resins in the present invention are chlorinated vinyl chloride resin particles, vinyl chloride resin, chlorinated vinyl chloride, chlorinated vinylidene resin, and preferably one or more types of chlorinated vinyl chloride resin having 60 to 70 wt. % of chlorine-containing content obtained by the postchlorinating method of the vinyl chloride resin having a polymerization degree of 500 to 1500 in view of the extrusion molding properties of the mixture composition sufficiently kneaded by applying high mechanical strength and high shearing force for the lead wire of hard carbon.

Preferably usable as the carbon powder in the present invention are fine powders of artificial graphite, natural flaky graphite, carbon black, coke, or carbon fiber, etc., and preferable results can be obtained by employing one or more types of fine powder of artificial graphite, natural flaky graphite having a mean grain size of 20 microns or less, and more preferably 10 microns or less, in consideration of the mechanical strength and the specific resistance of the lead wire of hard carbon thus obtained.

In the present invention, as required, in order to raise kneading characteristics and/or extrusion moldability by applying high shearing force, one or more types of plasticizer or solvent, such as DOP, DBP, TCP, DOA, DOS, DAP, propylene carbonate, N-methylpyrrolidone, etc., and/or one or more types of molding assistants, such as chlorinated polyolefinethylene-vinyl acetate copolymer, ethylene-acrylic copolymer, metallic soap, fatty soap, natural wax, petroleum wax, organic tin compound, etc., in fine amounts may be added.

A process for producing lead wires of hard carbon with the above materials will be concretely described.

5 to 60 wt. parts of the monomer or precondensate of furan resin, 10 to 60 wt. parts of chlorine-containing vinyl resin, 20 to 70 wt. parts of fine carbon powder, 0 to 40 wt. parts of plasticizer or solvent to be added as required, 0 to 40 wt. parts of molding assistant, and 0 to 10 wt. parts of carbonization regulator are weighed, and the mixture is uniformly mixed and dispersed by a high speed mixer, such as a HENSCHEL mixer. Then, high shearing force is applied to the resultant mixture to blend the polymer of the furan resin and the chlorine-containing vinyl resin to obtain the kneaded mixture having thermoplasticity capable of extrusion molding in which binder carbonized after calcining is physical chemically bonded to the surface of fine powder from the result of mechanochemical reaction generated by the mechanical energy. As the kneader for applying the shearing force, preferably usable are a two-roll machine, a three-roll machine, a pressure kneader, a BANBURY mixer, two-axis screw extruder, etc. The mixture may be heated to such a degree that the chlorine-containing vinyl resin does not vigorously dehydrochlorinate. Further, two or more kneaders may be continuously used.

A die head is then heated, as required, to approximately 180° C. by using a ram type extrusion molding machine or a screw type extrusion molding machine. The material is extrusion molded at a slightly thicker diameter than that of the final object due to the margin of contraction caused by calcining and carbonizing, and thereby obtaining the molding by cutting it in a desired length. In order to prevent the molding from degassing or surging in the extrusion molding step preliminary molding of the kneaded mixture in vacuum may be performed in case of using the ram type extrusion molding machine, and in the case of using the screw type extrusion molding machine, to achieve pelletization of the kneaded mixture.

When plasticizer or solvent is used for the mixture composition, the portion used with the composition is evaporated in the atmosphere or under reduced pressure, and then insolubilized and infusibilized. The insolubilizing and infusibilizing method includes a method for heating the composition to 150° to 300° C. in oxidative atmosphere, such as air or ozone, a method for heat treating the composition to 50° to 300° C. in a corrosive gas atmosphere, such as ammonia gas or chlorine gas, etc., or a method for irradiating the composition with a radioactive ray. In the present invention, the insolubilizing and infusibilizing method is not particularly limited, but at the end point of the insolubilizing and infusibilizing processes, the furan resin is cured by hydrochloride dissociated by dehydrochlorinating the chlorine-containing vinyl resin in relation to the polymerblended furan and the chlorine-containing vinyl resin. Thermoplasticity is lost by the polychlorinating reaction continued to the dehydrochloriding reaction of the chlorine-containing resin, thereby exhibiting a thermal curability of the molding as a whole.

The insolubilized and infusibilized molding is then gradually heated from room temperature in an inert gas atmosphere of nitrogen or argon, etc., to 700° C. or higher, preferably to 1000° C. or higher, to be carbonized, and then cooled to be removed as a product.

The present invention will be described by examples of a process for producing lead wires of hard carbon for supplying power to a fuel battery, but the present invention is not to be construed as limited to the particular examples.

EXAMPLE 1

Mixture composition of 25 wt. parts of precondensate of furan resin (Hitafuran VF-302 produced by Hitachi Chemical Co., Ltd., Japan), 25 wt. parts of chlorinated vinyl chloride resin having 65 wt. % of chlorination degree (Nikatemp T-742 produced by Nippon Carbide Industry Co., Ltd., Japan), 50 wt. parts of natural flaky graphite powder (CSP produced by Nippon Graphite Industry Co., Ltd., Japan), 1 wt. part of amide stearate, and 15 wt. parts of DBP, was sufficiently mixed and dispersed by a HENSCHEL mixer, then kneaded at 120° C. by a pressure kneader for 40 min., and then kneaded by a three-roll machine held at 125° C. at the roll surfaces for 40 min. Then, the kneaded mixture was removed, and pelletized by a pellet manufacturing machine to obtain extrusion molding pellets. The molding was then cut 20 cm long, most of DBP was evaporated in an oven heated to 150° C. under tension, then heated to 180° C. at the temperature rising velocity of 5° C./hr, and held at 180° C. for 2 hours so as to insolubilize and infusibilize the mixture. Thereafter, the mixture was heated to 300° C. from room temperature at the temperature rising velocity of 10° C./hr. in a nitrogen gas atmosphere, and heated to 300° to 1000° C. or higher at the temperature rising velocity of 30° C./hr., and then heated to 1500° C. at the temperature rising velocity of 200° C./hr. so as to carbonize the material, and then cooled to remove the product.

The performance of the obtained lead wire is shown in Table 1.

EXAMPLE 2

Mixture composition of 10 wt. parts of precondensate of furan resin (Prominate Q-1001 produced by Takeda Chemical Industries, Ltd., Japan), 5 wt. parts of furfuryl alcohol, 25 wt. parts of chlorinated vinyl chloride resin having 65 wt. % of chlorination degree (Nikatemp T-742 produced by Nippon Carbide Industry Co., Ltd., Japan), 55 wt. parts of natural flaky graphite powder (CSP produced by Nippon Graphite Industry Co., Ltd., Japan), 1 wt. part of amide stearate, 1 wt. part of chlorinated polyethylene powder, and 15 wt. parts of N-methylpyrrolidone was sufficiently mixed and dispersed by a HENSCHEL mixer, then kneaded at 120° C. by a pressure kneader for 40 min., and then kneaded by a three-roll machine held at 125° C. at the roll surfaces for 40 min. Then, the kneaded mixture was removed, and molded by a hydraulic press with a vacuum degassing unit to obtain a columnar preliminary molding. Then, with a die head heated to 100° C., the molding was extrusion molded by a ram type extrusion molding machine to obtain a molding having a section of a circle having a 3.5 mm of diameter. This molding was then cut 20 cm long, most of N-methylpyrrolidone was evaporated in an oven heated to 150° C. under tension, then heated to 180° C. at the temperature rising velocity of 5° C./hr, and held at 180° C. for 30 hours to be insolubilized and infusibilized. Thereafter, the mixture was heated under the same conditions as those in the Example 1 in nitrogen gas atmosphere, so as to be carbonized, and then cooled to remove the product.

The performance of the obtained lead wire is shown in Table 1.

COMPARISON EXAMPLE

Electric high density graphite generally sold in the market (having a catalog value of 90 MPa of bending strength) was cut to obtain a lead wire having a diameter of 3 mm and a length of 19 cm. The performance of the obtained lead wire is shown in Table 1.

TABLE 1

|  | Example 1 | Example 2 | Comparison |
| --- | --- | --- | --- |
| Diameter (mm) | 3.0 | 3.0 | 3.0 |
| Length (cm) | 19 | 19 | 19 |
| Specific weight | 1.4 | 1.4 | 1.9 |
| Specific resistance ($\times 10^{-4}$ ohm/cm) | 9.0 | 8.5 | 10.0 |
| Bending strength (MPa) | 260 | 280 | 60 |
| Bending elastic modulus (GPa) | 60 | 70 | 12 |
| Shore hardness | 85 | 85 | 60 |
| Phosphoric acid resistance | no change | no change | change |

The phosphoric acid resistance was observed with respect to the state of the sample of the anode after 100 hrs. by using phosphoric acid at 200° C. as electrolyte, an anode as a sample, a cathode as platinum, and supplying a current to a load under the condition of 50V-1A/dm$^2$.

The lead wire produced according to the process of the present invention has, as shown in Table 1, small electric resistance, no deterioration against the electrolyte of the fuel battery for an extended period with excellent corrosion resistance, a light weight such that the weight of the entire fuel battery device is not large, high surface hardness, excellent wear resistance, high mechanical strengths, such as bending strength and Young's modulus, as excellent properties of the lead wires for supplying power to the fuel battery as compared with those of the conventional material. Further, the process of the present invention is industrially simple and inexpensive to provide the lead wires.

What is claimed is:

1. A process for producing a lead wire of hard carbon for supplying power to a fuel battery, comprising the steps of:

uniformly mixing and dispersing a mixture composition comprising a monomer or a precondensate of furan resin, binder containing as a main ingredient chlorine-containing vinyl resin, said chlorine-containing vinyl resin being the only ingredient that is carbonized after calcining, and carbon powder;

applying high shearing force to the mixture composition;

molding the composition to obtain a preliminary molding;

extrusion molding the preliminary molding in a rod shape;

insolubilizing and infusibilizing the rod-shaped molding; and calcining the rod-shaped molding in an inert gas atmosphere.

2. The process according to claim 1, wherein said furan resin is a synthetic resin having a furan ring selected from the group consisting of furfuryl alcohol resin, furfuryl alcohol/furfural cocondensate resin, furfural/phenol cocondensate resin, furfural/ketone cocondensate resin, and furfuryl alcohol/phenol cocondensate resin.

3. The process according to claim 1, wherein said chlorine-containing vinyl resin is selected from the group consisting of chlorinated vinyl chloride resin particles, vinyl chloride resin, chlorinated vinyl chloride, and chlorinated vinylidene resin.

4. The process according to claim 1, wherein said carbon powder is selected from the group consisting of fine powders of artificial graphite, natural flaky graphite, carbon black, coke, and carbon fiber.

5. The process of claim 1, wherein the preliminary molding is prepared by molding the composition by a hydraulic press with a vacuum degassing unit.

* * * * *